United States Patent [19]
Nord et al.

[11] Patent Number: 4,950,119
[45] Date of Patent: Aug. 21, 1990

[54] STORAGE AND RETRIEVAL SYSTEM

[75] Inventors: Keith W. Nord, Stillwater; Mark S. Nord, Scandia, both of Minn.

[73] Assignee: Nordway, Inc., Stillwater, Minn.

[21] Appl. No.: 322,516

[22] Filed: Mar. 13, 1989

[51] Int. Cl.$^5$ ............................................. B65G 65/00
[52] U.S. Cl. ..................................... 414/277; 104/88; 212/213; 414/281; 414/401; 414/584
[58] Field of Search ............... 414/276, 277, 281, 396, 414/401, 560, 561, 584; 212/220, 221, 213, 141; 104/35, 88, 93; 180/209

[56] References Cited

U.S. PATENT DOCUMENTS

| | | | |
|---|---|---|---|
| 1,369,393 | 2/1921 | Burgess | 414/281 |
| 1,626,350 | 4/1927 | Newman | 212/141 |
| 2,174,260 | 9/1939 | Foulkes | 104/35 X |
| 4,700,798 | 10/1987 | Johansson | 180/198 X |

OTHER PUBLICATIONS

Litton High Density Mole ® System Product Bulletin 4(1989).

Primary Examiner—Sherman Basinger
Attorney, Agent, or Firm—Merchant, Gould, Smith, Edell, Welter & Schmidt

[57] ABSTRACT

A system for transporting, storing and retrieving goods (11) in a warehouse (10) is disclosed. A vehicle (16) moves the goods (11) upon a track system (18) into a storage area (22). The storage area (22) has a plurality of lanes (24) and tiers (33), (35), and the vehicle (16) is moved to the appropriate lane (24) utilizing a lift and transfer unit (28). The lift and transfer unit (28) docks with the appropriate lane (24) utilizing shafts (94), (96) which engage with receiving ends (100), (102) on the lane (24). A safety stop (108) is also provided to insure that complete docking has occurred before transfer of the vehicle (16) from the lift and transfer unit (28) to the storage racks (22) or vice versa.

14 Claims, 11 Drawing Sheets

STORAGE AND RETRIEVAL SYSTEM

FIELD OF THE INVENTION

This invention relates generally to a system for transporting, storing, and retrieving goods within a warehouse, and more particularly to a unique transport vehicle, storage assembly and docking apparatus for such a system.

BACKGROUND OF THE INVENTION

Many industries require a warehousing system in which the product can be stored for a relatively short period of time and retrieved quickly, often in the same day in which the product enters the storage area. Examples of such industries include the dairy industry, the baking industry, and the soft drink industry. The standard practice utilized to store these types of palletized goods is to simply set the pallets around the plant or warehouse, either in a stacked or unstacked configuration. This method uses a great deal of warehouse space and requires a large labor force to maintain it. There are also significant problems with inventory control for this type of storage system. Orders are typically hand-picked from the floor, resulting in numerous errors.

Regarding transportation and retrieval of the stored products, conveyor systems are typically utilized to move the product between various areas of the warehouse. However, with this method, the product must be lifted onto the conveyor and pulled onto the floor when the product reaches its destination. This system is completely manual and requires a large and costly labor force.

Alternatively, there are systems to lift and transport products and/or pallets. For example, "stacker cranes" or automatic forklifts have been employed to follow on a track which is built into the warehouse. However, this type of device is limited in its depth or reach into a storage area to two pallets and is able to carry only one pallet at a time. Another transport device, called a "mole" system, allows access five to ten pallets deep into a storage area. This system incorporates a vehicle which is on an umbilical cord from a "stacker crane" and carries one pallet at a time. Although the "mole" allows for greater depth of reach in a storage area or lane, the cord limits its mobility. These two systems do not adequately accommodate an industry where a high volume of goods is moved in and out of the warehouse quickly, nor do they allow retrieval of quantities of goods smaller than a unit or pallet. Consequently, the warehouse space is not utilized efficiently.

Another example of a lift and transport system is a "walking beam" type storage system. In this system, goods are stored in single case lots. Goods rest on rails and are moved by rocker units which lift a case of goods, move forward approximately one case length, and place the case on the rest rail. Goods are "walked" through the warehouse in this manner. However, this system does not provide the versatility or efficiency that the present invention provides.

The present invention addresses the problems associated with the prior art devices and provides for a storage and retrieval system that is automated and particularly suited for a warehouse situation where goods are moved at a rapid rate.

SUMMARY OF THE INVENTION

The present invention includes a system for storing and retrieving goods within a structure having an entrance area and an exit area. The system includes a vehicle for transporting the goods between the areas, wherein the vehicle has a plurality of wheels driven by the drive means of the system; an electrical control means interconnected to the vehicle drive means; a track including a track rail configuration upon which the vehicle wheels are supported, the track interconnecting a plurality of areas within the warehouse structure; and storage means for storing the goods, having a plurality of lanes with a storage rail configuration corresponding to the track rail configuration. The system further includes vehicle turning means which is positioned between adjacent track sections, where the turning means includes a rotatable rail configuration corresponding to a track rail configuration. The system also includes vehicle transfer means positioned proximate the storage means, where the vehicle transfer means includes means for moving a stationary vehicle in a lateral direction so as to position the vehicle proximate a particular lane. The vehicle transfer means has a transfer means rail configuration corresponding to said track rail configuration. Alignment means are also included for aligning the rail configurations before the vehicle passes between separate rail configurations.

Another aspect of the invention is a vehicle for transporting the goods. The vehicle comprises a framework having flanges at the bottom thereof for supporting the goods, where the framework forms a holding area sized and configured to accommodate the goods; a plurality of wheels connected to the framework; drive means connected to the wheels for rotation of the wheels in the forward and reverse direction; and electrical control means operatively interconnected to the drive means. The vehicle also preferably includes lift means for moving the framework of the vehicle in a vertical direction with respect to the wheels.

Yet another aspect of the present invention is an apparatus for transferring a vehicle from a first vehicle support structure to a second vehicle support structure. The apparatus comprises a stationary framework; a vehicle carriage which supports the vehicle and which has a carriage rail configuration corresponding to a rail configuration on the first and second vehicle support structures; shaft alignment means for aligning the vehicle carriage track with respect to the track of one of the vehicle support structures; sensing means for sensing the engagement of the shaft and corresponding aperture; and drive means interconnected to the sensing means for moving the vehicle from the vehicle carriage to one of the vehicle support structures.

A method for transporting, storing and retrieving goods within a warehouse having a storage area is also disclosed. The method comprises the steps of loading the goods within a vehicle, the vehicle being supported by a transport track; moving the vehicle along the transport track; aligning the transport track with a storage area track; transferring the vehicle from the transport track to the storage area track; depositing the goods within the storage area; and moving the vehicle away from the storage area.

The present invention provides a storage and retrieval system which allows automated transport of goods within a warehouse. The present invention allows the goods to be automatically transported, stored, and retrieved in a very short period of time, if necessary. With conventional systems, transport trucks must sit idle while orders are hand-picked and filled. Utilization of the present invention cuts idle truck time substantially. The present invention particularly suits high volume industries such as the dairy industry where high volumes of goods are involved which are dated for freshness. Such goods must be tracked closely so that they are moved out of the warehouse according to the freshness date. The control unit of the present invention tracks the location of each vehicle and the location of the goods throughout the system so that the goods are easily stored and retrieved. The present invention also allows the versatility of retrieving an exact desired quantity of goods rather than retrieving an entire pallet at a time.

Because the present invention is automatic, tremendous labor expenses related to other methods of storage are eliminated. Rather than employing a substantial number of workers to unload, lift, transport, stack, and locate the goods as is necessary with manual systems, the storage and retrieval system of the present invention requires workers only at the entrance and exit areas of the warehouse to load and unload the transport vehicles, as well as a small number of additional workers to monitor the proper functioning of the automatic system of the present invention. As a result, the amount of manual labor and the work force demands are substantially reduced.

The multi-tier, multi-lane storage racks assembly provides a very efficient and organized manner of storage. This design allows great space savings. Therefore, a warehouse utilizing the present invention is able to handle a much greater volume of goods than conventional methods would allow, thereby increasing plant capacity.

Another advantage of the present invention is the improved control over inventory. Because the vehicles are tracked by computer, the inventory is constantly monitored. This system increases the accuracy with which orders can be met and reduces human error and pilferage associated with conventional systems. As a result, there is a substantial reduction in the number of errors in the shipping and billing for the goods. The control system also allows a first in first out order system to be utilized to maximize efficiency.

Another advantageous feature of the present invention is the docking apparatus which allows the vehicle to move between various components of the storage and retrieval system, i.e., between the transport vehicles, the turntables, the lift and transfer unit, and the storage racks. The docking apparatus allows for alignment of these components so that the vehicle can pass there-between without necessitating the precise positioning of the components with respect to each other.

While the present invention will be described with respect to a preferred configuration of the apparatus, and with respect to preferred materials and shapes of construction, it will be understood that other configurations, materials and shapes could be used for the construction of the storage and retrieval system, without departing from the spirit and scope of this invention. Various advantages and features of novelty which characterize the invention are pointed out with particularity in the claims annexed hereto and which form a part hereof. However, for better understanding of the invention and its advantages obtained by its use, reference should be made to the drawings which form a further part hereof and to the accompanying descriptive matter in which there is illustrated and described a preferred embodiment of the invention.

DETAILED DESCRIPTION OF THE PREFERRED EMBODIMENT

Figure 1:
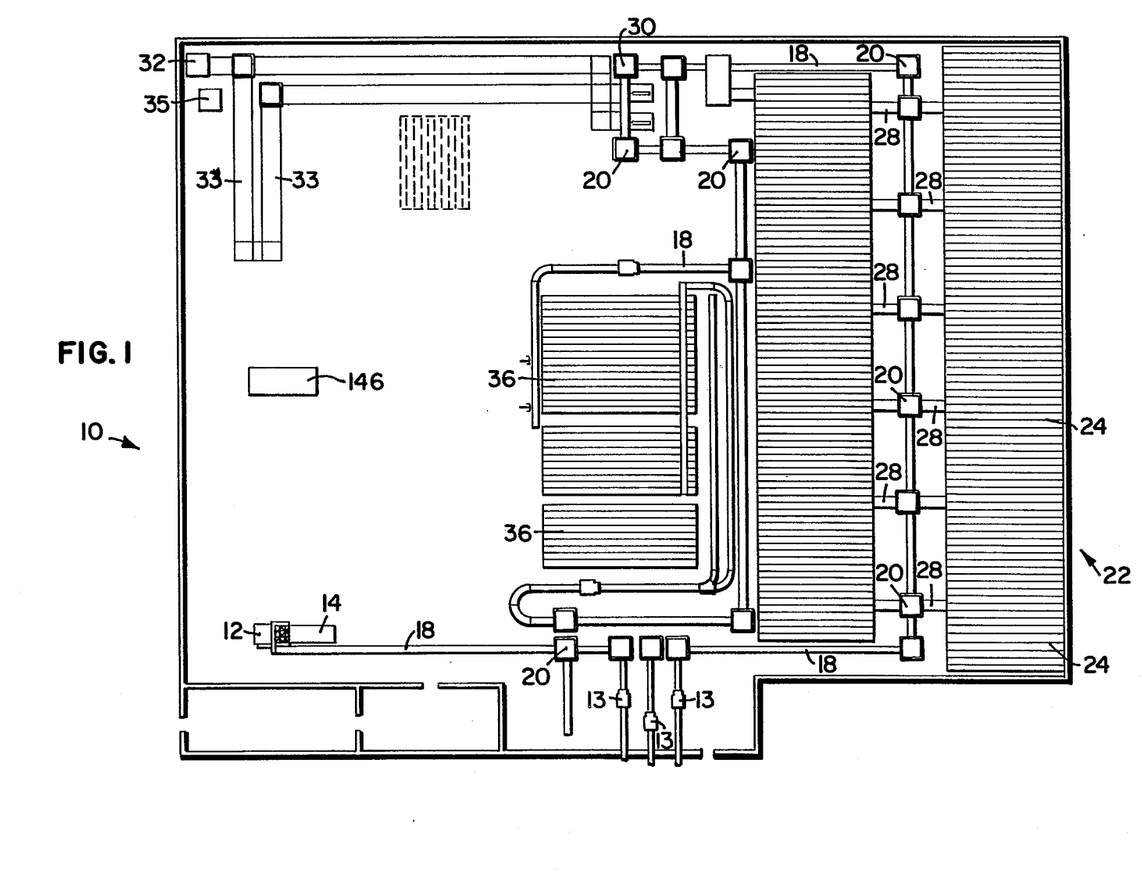
FIG. 1 is a schematic plan view of a warehouse utilizing the storage and retrieval system of the present invention.

Referring to the Drawings, a possible configuration of an entire warehouse system 10 used in conjunction with the present invention is shown in FIG. 1. Goods 11 (not shown in FIG. 1) are moved into the warehouse or structure on pallets at entrance point or area 12 from a transportation vehicle, such as a truck. The goods 11 are depalletized at depalletizer area 14. The goods 11 may be placed in appropriate transport containers, such as crates, and stacked. Goods 11 may also be moved into the warehouse system 10 from another part of the plant such as the processing or manufacturing area by utilizing stackers 13. The goods 11 are moved in singly and are stacked by stackers 13 in order to be introduced into the system 10.

Figure 12:
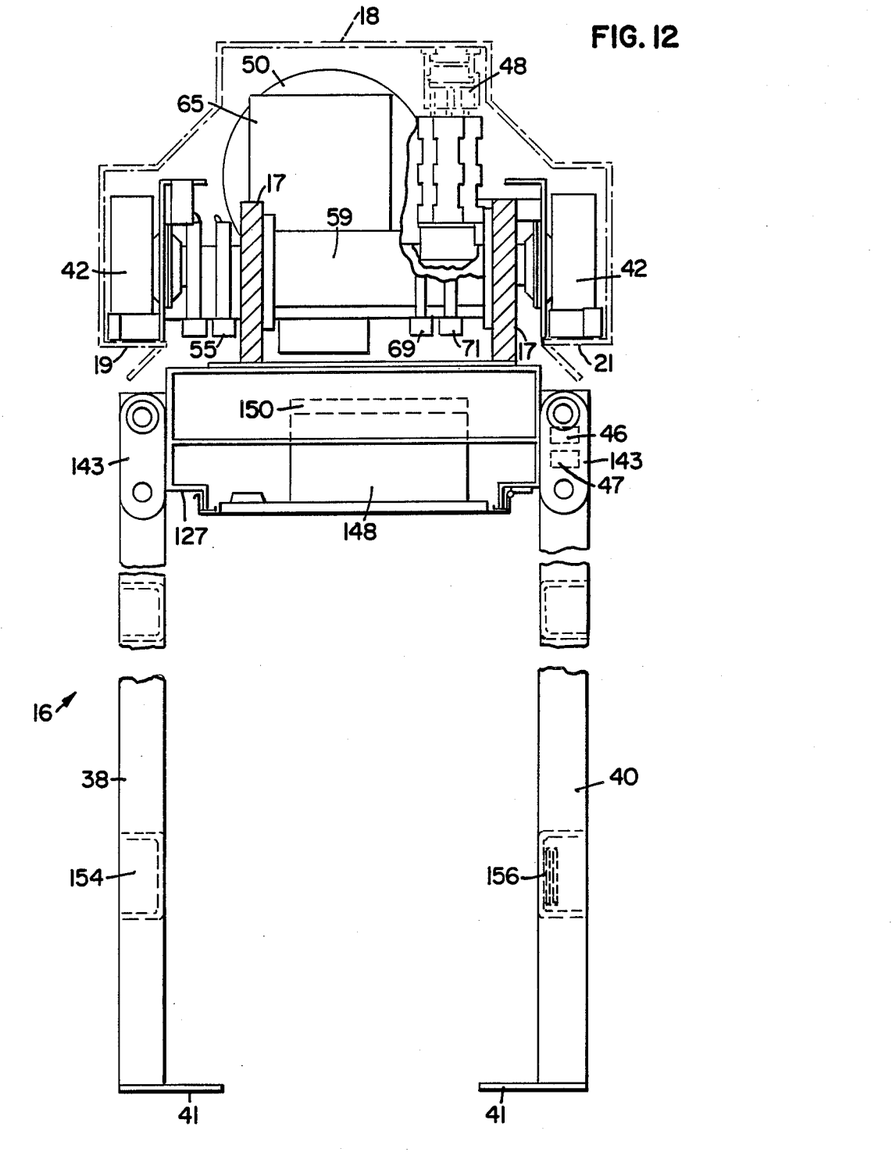
FIG. 12 is an end elevational view of a vehicle utilized with the present invention.
Figure 13:
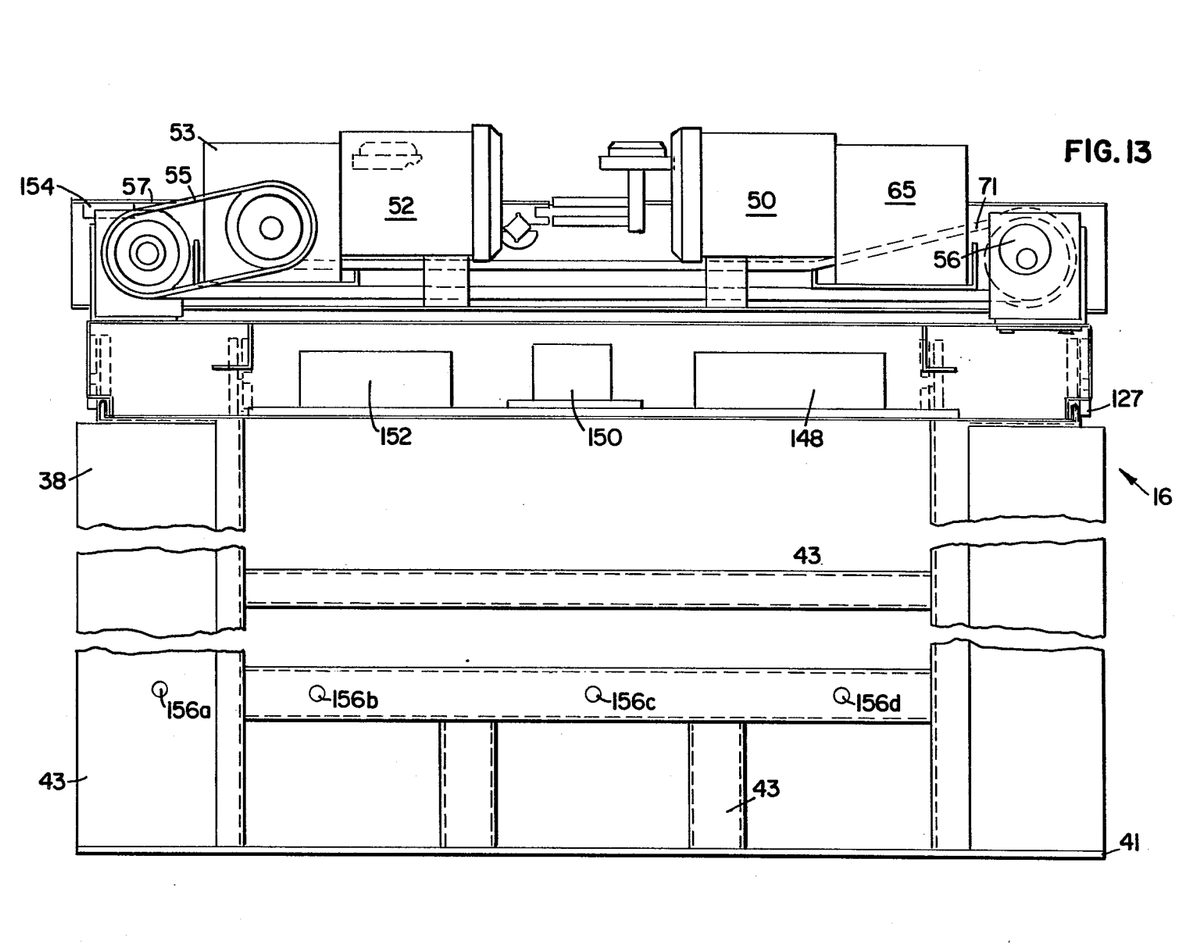
FIG. 13 is a side elevational view of a vehicle utilized with the present invention.
Figure 14:
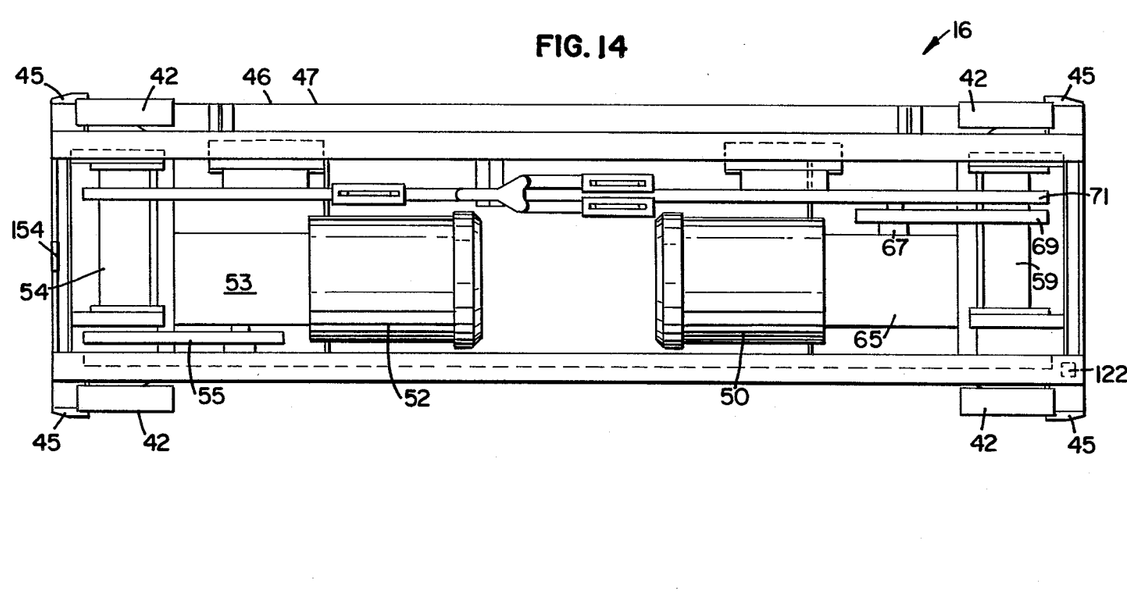
FIG. 14 is a plan view of the vehicle of the present invention.

The goods 11 are then put into vehicles 16 for transport to another area of the warehouse 10. The design of the transport vehicles 16, which will be discussed in greater detail below, depends upon the size, weight and shape of the goods 11 to be transported. In the preferred embodiment illustrated, the vehicles 16 are designed to transport dairy goods. Each vehicle 16, illustrated in FIGS. 12, 13 and 14, is able to accommodate three rows of crates, with the number of stacked crates in the vertical direction depending upon the height of the vehicle 16. As shown in FIG. 12 and 13, the vehicles 16 are generally rectangular with open ends for easy loading and unloading of goods 11.

The fully loaded vehicles 16 are then moved on a transport track 18. In the preferred embodiment, the track or track rail configuration 18 consists of a stationary support structure from which the vehicle 16 hangs and is supported as it moves through the warehouse 10. Rails 19, 21 on the track 18 support a plurality of vehicle wheels 42 to allow for movement of the vehicle 16. An electrical bus 48 is mounted to the inside of the track 18, and the bus 48 powers movement of the vehicle 16. As shown in FIG. 1, the track 18 is linear in configuration, there being a plurality of turntables or vehicle turning means 20 utilized to rotate the vehicles 16 to allow movement of the vehicles 16 in different directions throughout the warehouse 10. In this manner, the vehicles 16 rotate on their center with the aid of the turntables 20, so that the system uses minimal floor space. Alternatively, portions of the track 18 could have a curved configuration which would minimize or eliminate the need for the turntables 20.

Figure 11:
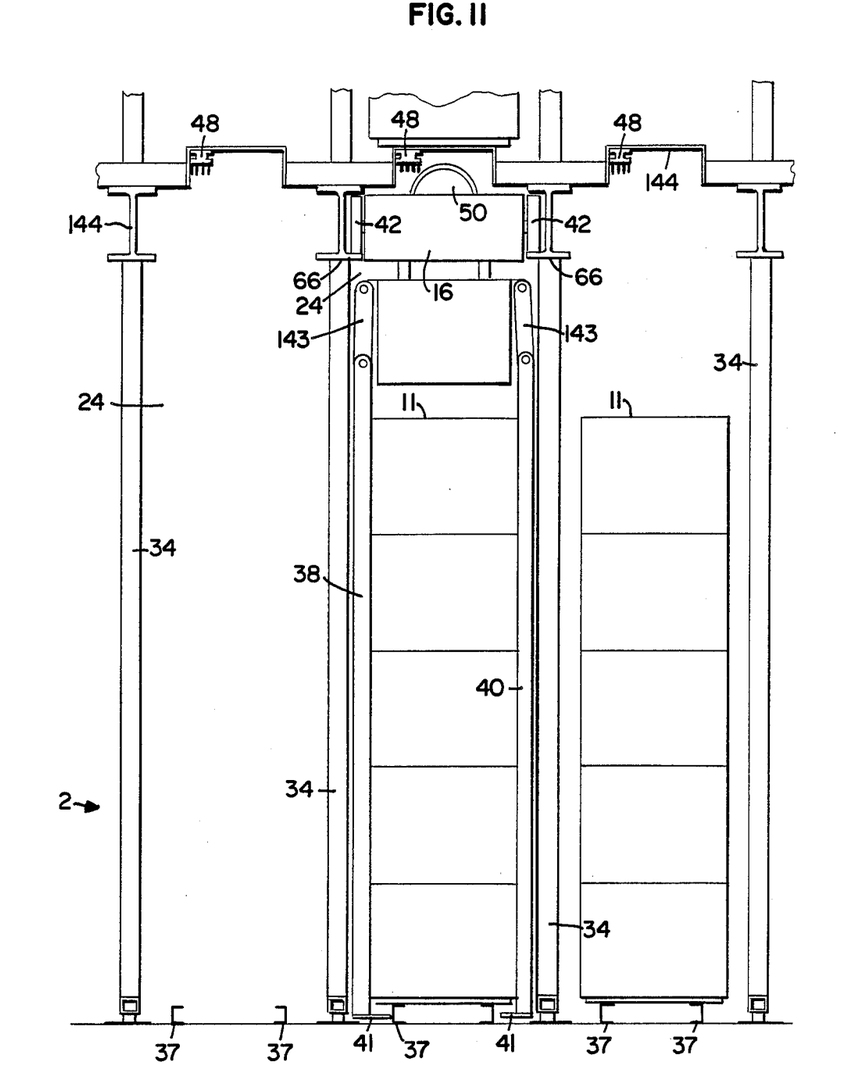
FIG. 11 is an end elevational view of three lanes of the storage racks and a vehicle utilized with the present invention.

Referring again to FIG. 1, the vehicles 16 are moved via the track 18 to an appropriate storage area of the warehouse 10. In the preferred embodiment, the storage area consists of a storage racks assembly 22. The storage racks 22 are made up of storage lanes 24 which are sized and configured to hold goods 11 carried by the vehicles 16. Three lanes 24 of storage racks 22 are illustrated in FIG. 11. The left lane in FIG. 11 is empty and is ready to receive the goods to be stored. The center lane in FIG. 11 has a fully-loaded vehicle 16 located in the lane 24. The right lane in FIG. 11 illustrates the goods 11 as stored therein, after the vehicle 16 has deposited them. The vehicles 16 are moved between the track 18 and the appropriate storage lanes 24 by a lift and transfer unit or vehicle transfer means 28. The vehicles 16, storage racks 22, and lift and transfer units 28 will be discussed in greater detail below. The vehicle 16 carries the goods 11 down the storage lane 21, at which point the goods 11 are automatically unloaded from the vehicle 16 and remain within the lane 24 until a vehicle 16 returns to retrieve them. The goods 11, within the vehicle 16, will be returned to a track 18 by the lift and transfer unit 28. The vehicle 16, carrying the outgoing goods 11, then transports the goods 11 from the storage area 22 to the palletizer area 30. The goods 11 may then be placed on pallets at palletizer area 30, shown in FIG. 1. The pallets are supplied by pallet magazine 32, picked up by a vehicle 16 which is sized to carry them, and moved to palletizer area 30 for loading. The pallets of goods 11 may then be moved to pallet area 33 by the vehicle 16 and then moved onto trucks or otherwise removed from the warehouse system 10 by pallet jack 35.

In the preferred embodiment, the track 18 is supported above the warehouse floor by suitable support means. In this manner, the vehicle 16 is supported by the track 18 from its upper end. The distance between the track 18 and the warehouse floor is dependent upon the design of the vehicle 16, which is determined by the size constraints of the goods 11 being transported. In the preferred embodiment, the track 18 is approximately six to ten feet from the warehouse floor. The cross-sectional configuration of the track 18 is illustrated in FIG. 12 in dashed lines. The track 18, in the preferred embodiment, is generally hat shaped at its upper end, with support rails 19 and 21 on each end thereof similar to the configuration of track 66 in FIG. 10.

Figure 2:
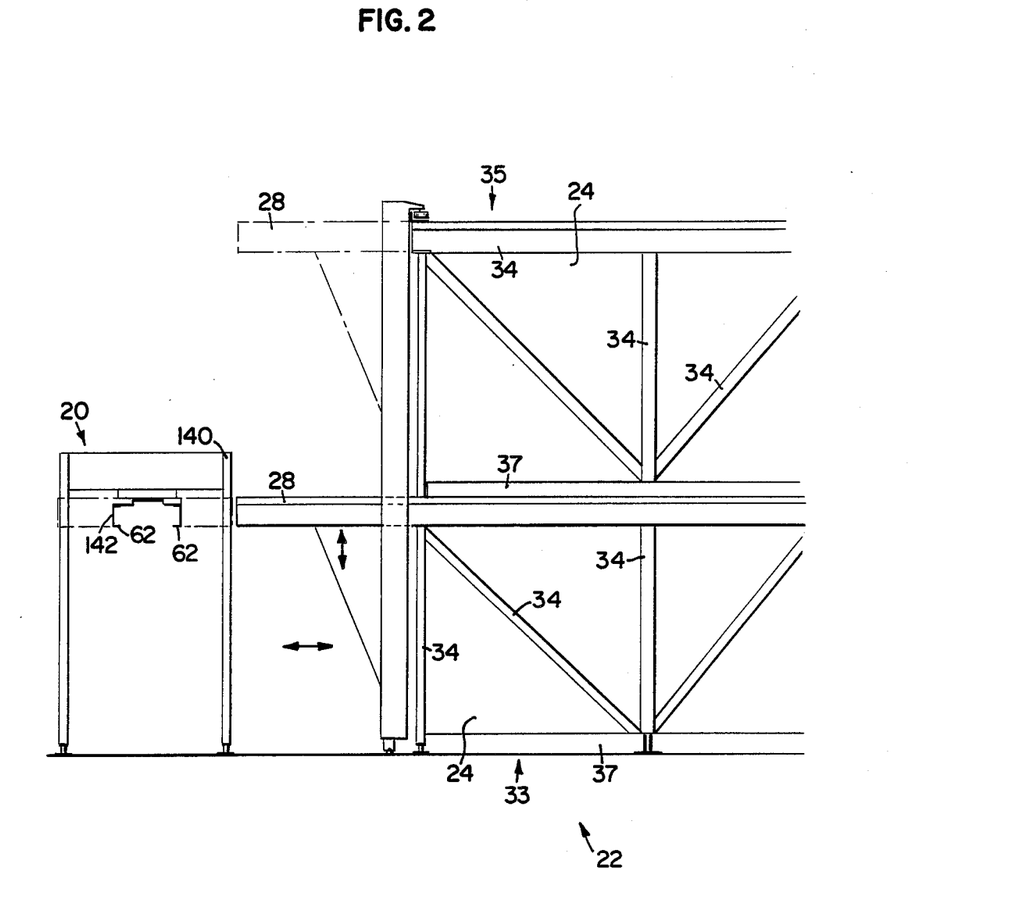
FIG. 2 is a side elevational view of a turntable, lift and transfer unit, and storage racks utilized with the present invention.

The turntable 20 has a suitable frame 140, shown in FIG. 2. Within the turntable 20 is a vehicle turn carriage or rotatable rail configuration 142, which has a hat shape or rail configuration corresponding to the track 18. This vehicle turn carriage 142 and track 62 allows the vehicle 16 to move from the rails 19 and 21 of the track 18 to the track 62 within the turntable 20.

Similarly, the vehicle 16 must also transfer or move onto the lift and transfer unit track 64. The lift and transfer unit 28 has a suitable frame assembly 130 shown in FIG. 3. Within the lift and transfer unit 28 is a vehicle lift carriage assembly or transfer means rail configuration 131, which has a track or rail configuration corresponding to the configuration of the track 18 in order to allow the vehicle to move from the rails 19 and 21 of the track 18 to the track 64 of the vehicle lift carriage assembly 131. The vehicle 16 also moves upon the storage rack track 66 shown in FIG. 10. Each lane 24 of the storage racks 22 has a suitable track or storage rail configuration 144 shown in FIG. 10. The storage rack track 66 has a shape corresponding to the track 64, to allow the vehicle 16 to move from track 64 to the track 66 of each lane 24.

To move out of the storage area 22, the vehicle 16 travels on the storage rack track 66 to the lift and transfer unit track 64 and then to the turntable track 62. Each of the tracks 18, 62, 64 and 66 are of the same size and cross-sectional rail configuration. The various tracks are aligned by the docking apparatus of the present invention so the vehicle 16 may move freely between the various components of the storage and retrieval system 10, i.e., between the tracks 18, turntables 20, lift and transfer unit 28, and storage lanes 24.

The storage racks 22, in the preferred embodiment, are sized and configured to receive goods of predetermined size and shape. In the preferred embodiment, the storage rack system 22 has two rows or tiers 33 and 35 in vertical relationship and a plurality of lanes 24, as shown in FIG. 2. Suitable horizontal, vertical, and diagonal support members 34, shown in FIG. 2, form the lanes 24 which serve as storage areas for the goods 11. In the preferred embodiment, there is a retainer rail 37 (see FIG. 11) at the bottom of each lane 24, the retainer rail 37 serving to support the goods 11 which are deposited for storage within the lane 24.

In one particular embodiment for a dairy application, the storage racks 22 are made up of 88 lanes per tier and hold 20 stacks of goods per lane. Therefore, the two tiers may hold 3,520 stacks or 17,600 cases of goods. Using the dairy industry as an example, various portions of the storage rack system 22 may be designated and designed to hold gallons or half gallons of milk. In another area of the warehouse 10, storage racks 36 may be sized and configured to hold corrugated boxes which contain yogurt, sour cream, or cottage cheese, for example.

Figure 3:
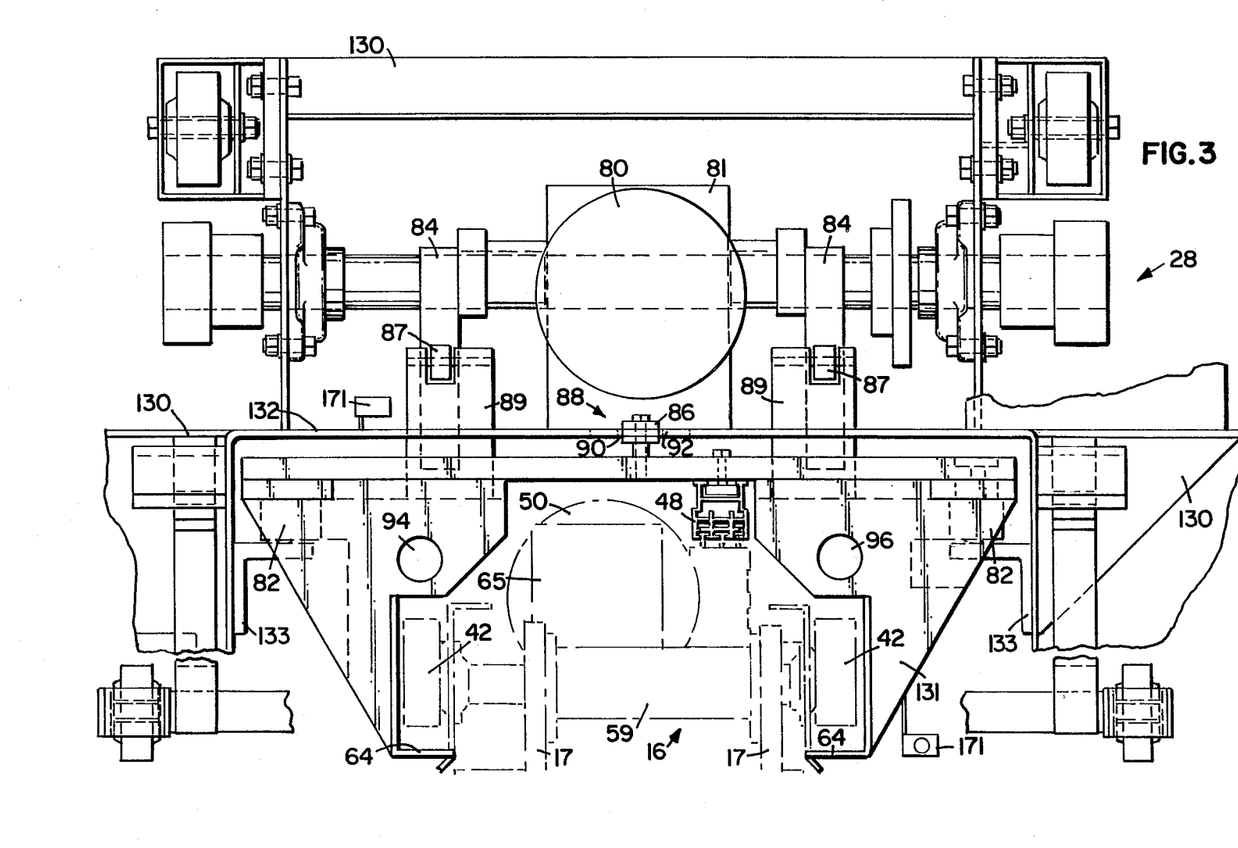
FIG. 3 is a front elevational view, partially cutaway, of a lift and transfer unit and carriage assembly utilized with the present invention.

As mentioned above, a lift and transfer unit 28 moves the loaded vehicle 16 to the entrance end of the appropriate lane 24 by moving the vehicle 16 in the horizontal and vertical directions by an appropriate distance. A plurality of lift and transfer units 28 are utilized for each set of storage racks 22 in the preferred embodiment as illustrated in FIG. 1. Depending upon the alignment of the track 18 with respect to the lift and transfer unit 28, the vehicle 16 may need to be turned within a turntable 20 to line up with the lift and transfer unit 28, so that the vehicle 16 may move into the lift and transfer unit 28, as shown in FIG. 2. After moving an appropriate distance laterally and vertically, the lift and transfer unit 28 lines up and docks with a lane 24 so that the vehicle 16 may move into the lane 24. That is, the unit 28 moves laterally to the appropriate lane 24 and may move upward, carrying the vehicle 16 to the second tier 35 to allow access to the upper lanes 24. The lift and transfer unit 28 is shown in FIG. 2 in a lower position proximate the lower tier 33 and, in dashed lines, in the upper position proximate the upper tier 35. FIG. 3 illustrates an upper portion of a vehicle 16 (in dashed lines) as positioned with respect to the lift and transfer unit 28.

Suitable means for moving vehicle 16 in a lateral direction (not shown) allow the lift and transfer unit 28 to move in the horizontal or lateral direction in order to change lanes 24. In addition, separate lift drive means (not shown) are provided to move the lift and transfer unit 28 vertically between the tiers 33 and 35, if multiple tiers are provided in the storage racks assembly 22. These drive means are of the sort well-known to those skilled in the art and will not be described in detail herein.

As illustrated in FIGS. 12, 13 and 14, the vehicle's 16 holding area for the goods 11 is generally rectangular in the preferred embodiment, having parallel vertical side walls 38 and 40 and open ends. The vertical side walls 38 and 40 may be solid plates or may be formed by a plurality of support members 43 as shown in FIGS. 12 and 13. As shown in FIG. 12, the bottom end of the sidewalls 38, 40 terminate in a pair of horizontal flanges 41, the flanges 41 serving to support the goods 11 which are carried within the vehicle 16. The wheels 42 are made of a material such as neoprene, in the preferred embodiment, and each vehicle 16 preferably has four wheels 42 as shown in FIG. 14. The vehicle 16, in the preferred embodiment, has side guides 45 as illustrated in FIG. 14. The side guides 45, connected to the four corners of the vehicle 16, slidably abut the tracks 18, 62, 64, 66 so as to aid in guidance and travel of the vehicle 16.

The goods 11 are carried between side walls 38 and 40, which are partially cutaway in FIG. 12. In the preferred embodiment, the goods 11 are clamped within the vehicles 16. A pair of hingelinks 143 at the upper end of the side walls 38, 40 allow the vehicle 16 to swing transversely, which allows for goods 11 or stacks of slightly different widths to be accommodated with the same basic vehicle size and design. The size and configuration of the vehicle 16 may be varied to accommodate the goods 11 which are to be transported and stored.

Forward and reverse movement of the vehicle 16 is accomplished by drive means or drive motor 52 mounted upon the vehicle 16, as shown in FIGS. 12, 13 and 14. The electric drive motor 52 is powered by an electrical bus 48. The drive motor 52 is operatively connected to a reducer 53, which causes rotation of a drive belt 55 and sprocket 57. The sprocket 57 is operatively connected to the vehicle drive wheels 42. Thus, the drive motor 52 drives the wheels 42 for forward and reverse movement of the vehicle 16.

The present invention also includes suitable electrical control means for automatic control of the vehicle's movement and functions. Each vehicle 16 has a photoswitch sender 46 and a photoswitch receiver 47, shown in FIGS. 12 and 14, which communicate with fixed senders and receivers (not shown). The fixed senders and receivers are mounted throughout the system 10 in appropriate positions where commands need to be signaled to the vehicle 16. For example, each lift and transfer unit 28 of the system includes a fixed sender and receiver. The fixed senders and receivers are electrically interconnected to a central control unit 146 (shown in FIG. 1) so as to allow the control means 146 to monitor and direct the movement of the vehicle 16. Each vehicle 16 has an assigned number or designation so that its position can be monitored at all times. Suitable control means 148 mounted upon the vehicle 16 controls the motors which move the vehicle 16. Also mounted upon the vehicle are a Programmable Logic Controller or PLC 152 and relays 150. The PLC 152 communicates with the photoswitch sender 46 and photoswitch receiver 47 and uses this information to control the functions of the vehicle 16. The relays 150, in communication with the PLC 152 and control means 148, signals the motors of the vehicle for their movement and relays instructions from the PLC 152 to the appropriate motor. The electronic components on the vehicle 16 are contained within a suitable enclosure 127 (FIG. 12) at the upper end of the vehicle 16. The vehicle 16, in the preferred embodiment, is programmed to: (1) proceed along the track 18; (2) que up or line up along the track system 18 or in an appropriate lane 24; (3) take a product from production to storage; (4) pick up stacks of product from the storage area; (5) face up a storage lane or pick up a certain number of stacks from a storage area; and (6) deposit its load.

A plurality of photoelectric cells 154 are mounted on the vehicle 16 as illustrated in FIGS. 12-14. The photoelectric cells 154 identify the vehicle's position and signal the proximity of an adjacent vehicle 16 or structure to prevent a collision. Four photoelectric cells 154 mounted on side wall 38 have corresponding reflectors 156 mounted on side wall 40 in the preferred embodiment. The four photoelectric cells 154 on side wall 38 and the reflectors 156a-d sense the proximity of accumulated stacks of goods 11 so that the vehicle 16 moves the appropriate distance towards the goods 11 to perform the proper task.

For example, in the preferred embodiment, first sensor 154 and reflector 156a sense accumulated stacks of goods 11 to indicate where the vehicle 16 should deposit the goods 11 that it is carrying so as to stack the goods 11 in a space efficient manner. Second sensor 154 and corresponding reflector 156b indicate to the vehicle 16 the distance the vehicle 16 should move in order to be properly positioned to pick up one stack of goods 11. Third sensor 154 and reflector 156c and fourth sensor 154 and reflector 156d communicate the distance the vehicle 16 must move so that it is in a position to pick up 2 or 3 stacks of goods 11, respectively.

Another novel feature of the present invention is the manner in which the vehicle automatically loads and unloads the goods 11 from the storage lane 24. As noted above, each storage racks lane 24 has a bottom retaining rail 37 which supports the goods 11 when the are being stored. A lift motor 50, mounted on top of the vehicle 16, serves to move the vehicle framework between a first, upper position and a second, lower position, there being approximately a one inch difference between the two positions in the preferred embodiment. When the vehicle 16 is in its upper position, it is able to move down the lane 24, and the bottom flanges 41 of the vehicle 16 are above the retaining rail 37. This allows the goods 11 to be transported down the lane 24 above the retaining rail 37. When the vehicle 16 is adjusted to be in its lower position, the flanges 41 descend below the retaining rail 37, thus depositing the goods 11 carried by the vehicle 16 upon the retaining rail 37, as shown in the right lane 24 of FIG. 11.

In the preferred embodiment, this vertical movement of the vehicle framework is accomplished by the lift means of the present invention. Specifically, the vehicle 16 is provided with suitable cam assemblies, a front cam assembly 54 and rear cam assembly 59, as illustrated in FIGS. 12-14. The rear cam assembly 59 includes rotatable cams 56 and cam followers 17, whereas the front cam assembly 54 includes rotatable cams 61 and cam followers. The lift motor 50 controls the cam assemblies 54 and 59. Lift motor 50 is operatively connected to reducer 65 which is in turn connected to lift sprocket 67. Rotation of the lift sprocket 67 controls movement of roller chain 69 which is connected to the rear cam assembly 59, and also controls movement of roller chain 71 which is connected to the front cam assembly 54. The roller chain 69 and roller chain 71 rotate the front and rear cam assemblies 54 and 59 to lift the vehicle 16 in an upper position when it is carrying stacks of goods, and they return the vehicle 16 to a downward position when the vehicle 16 has unloaded the stacks. The vehicle framework is supported with respect to the wheels 42 by means of cam followers 17 which also function as suitable support members in the preferred embodiment. The cam followers' or support members' 17 position is adjustable in the vertical direction according to the position of the front and rear cam assemblies 54, 59. Thus rotation of the cams 56, 61 causes vertical movement of the cam followers 17, 63 which in turn lifts or lowers the vehicle side walls 38, 40 and flanges 41. It is to be understood that other suitable means for accomplishing the vertical movement of the vehicle 16 are within the scope of the present invention.

The vehicle 16 moves into or out of the storage lanes 24 by means of the docking mechanism or docking apparatus 67 of the present invention. The function of the docking mechanism is to close any gap between the tracks of the lanes 24 or turntable 20 so that the vehicle 16 may proceed between connected or adjacent tracks.

Figure 4:
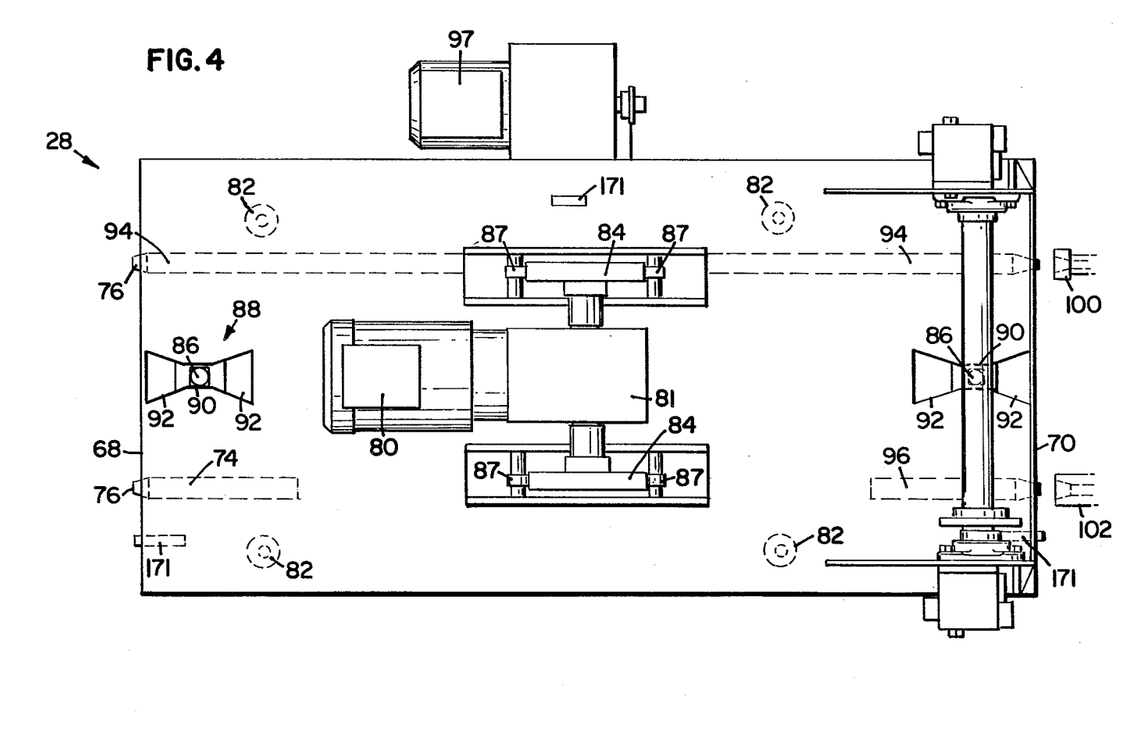
FIG. 4 is a plan view of the lift and transfer unit of the present invention.
Figure 15:
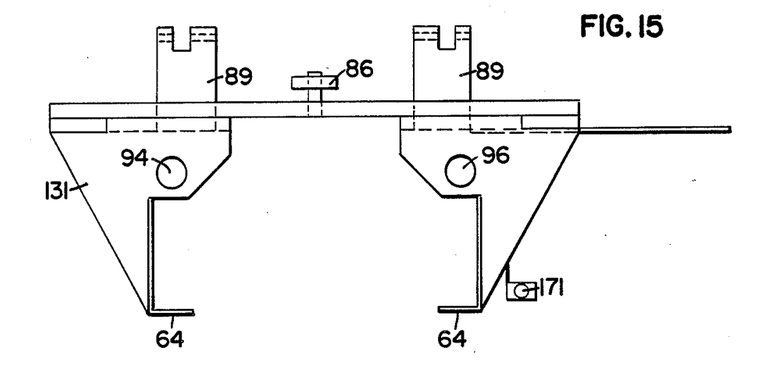
FIG. 15 is an end elevational view of the carriage assembly of the present invention.

The docking mechanism components are illustrated in FIGS. 2, 3 and 4. As described above, the function of the lift and transfer unit 28 is to move the vehicle 16 from the ground level track 18 to the appropriate tier 33 or 35 and lane 24 of the flow rack assembly 22, or vice versa. The lift and transfer unit 28 has a first, front end 68 and second, back end 70. In the preferred embodiment, the first end 68 docks with a first vehicle support structure or turntable 20 while the second end 70 docks with a second vehicle support structure or the lanes 24 of the storage racks 22. The lift and transfer unit 28 consists of a stationary exterior frame 130 which supports a movable vehicle carriage 131, as shown in FIG. 3. The vehicle carriage itself, apart from the lift and transfer unit 28, is illustrated in FIG. 15. The vehicle carriage 131 moves a small distance relative to the frame 130 during the docking process, as will be described fully below. The stationary frame 130 consists of suitable frame members, including a horizontal top plate 132 and angles 133. The angles 133 support a plurality of ball transfers 82, which support the carriage 131 with respect to the frame 130.

As viewed in FIG. 4, the lift and transfer unit 28 includes docking control shaft 94 and stationary shaft 74 proximate the left end or front end 68. Docking control shaft 94 extends from the first end 68 to the second end 70 of the lift and transfer unit 28. Stationary shaft 96 and docking control shaft 94 proximate the right end or back end 70 of the unit 28. These shafts 94, 96, and 74 along with corresponding apertures 100, 102 and 78 comprise the shaft alignment means. Shafts 94 and 74 allow docking of the lift and transfer unit 28 with the turntables 20. Tapered ends 76 of the shafts 94 and 74 fit within corresponding turntable shaft receptacles (not shown) which are formed within the framework of the turntable 20. The opposite tapered end of shaft 94 and shaft 96 fit within the corresponding receiving ends or apertures 100 and 102 of each lane 24, and thereby allow alignment and docking of the lift and transfer unit 28 with the lanes 24. As explained below, shaft 94 rotates during the docking process to activate a mechanical stop 108, whereas the shaft 96 remains stationary.

The lift and transfer unit 28 includes a docking motor or drive means 80 which controls movement of the carriage 131. The carriage 131 includes cams 84 and cam followers 86. The top plate 132 of the lift and transfer unit 28 has two cut out portions 88 in the preferred embodiment. These cutouts 88 preferably have a bow tie shape shown in FIGS. 3 and 4, with a narrow portion 90 between two wide portions 92. The cutouts 88, cam 84 and cam followers 86 and 87 comprise the cam alignment means for the present invention. The docking motor 80, reducer 81, ball transfers 82, cams 84, cam followers 86 and 87, mounting brackets 89 and bow tie cutouts 88, are utilized for docking with the turntable 20 or lane 24 of storage rack 22.

The shafts 74, 94, 96 move in and out of the front and rear docking positions by means of the docking motor 80. The docking motor 80 is operatively connected to docking reducer 81 which drives cams 84. Cam followers 87 are interconnected to cams 84 as shown in FIGS. 3 and 4. Cam followers 87 fit within mounting brackets 89 which are fixed to carriage 131. The cam followers 87, driven by cams 84, move mounting brackets 89 and thus carriage 131 which, in turn, drives cam 86 in the bow tie cutout 88 which allows the carriage 131 and vehicle 16 to float and align. Cam follower 86, interconnected to cams 84, through cam followers 87 and mounting brackets 89, move within the bow tie cutout 88. The cam follower 86 is sized and configured to be slightly smaller than the narrow portion 90 of the bow tie cutout 88. When the cam follower 86 moves into the narrow portion 90, the carriage 131 is stationary with respect to the frame 130. When the cam follower 86 is in one of the wide cutout portions 92, the carriage 131 may move laterally and vertically to align, for example, with the storage lane 24. In this manner, the carriage 131 and vehicle 16 are moveable between three positions during the docking process, i.e., docked with the turntable 20 when the cam follower 86 is in the left side of the cutout 88; undocked, when the cam follower 86 is within the central narrow portion of the cutout; and docked with the storage racks 22, when the cam follower 86 is in the right, wide portion 92 of the cutout 88. Movement between these three positions is accomplished by means of the docking motor 80. In the preferred embodiment, suitable sensing means 171 detect the position of the carriage 131. The sensing means 171, shown in FIGS. 3, 4, and 15, sense the proximity of metal objects, such as the turntables 20 or lane 24 to indicate whether docking is complete and also indicate whether cam 86 is in the narrow portion 90 of bow tie cutout 88.

Ball transfers 82 help support the carriage 131 and vehicle 16, and allow the carriage 131 and vehicle 16 to move in any direction necessary to line up the carriage 131 and the vehicle 16. The ball transfers 82 are able to move in any direction, allowing the docking motor 80 to move the carriage 131 so that the shafts 94 and 74 may be received by the receptacles (not shown) of the turntable 20 or shafts 94 and 96 may be received by receiving ends 100 and 102 on the storage racks.

Figure 5:
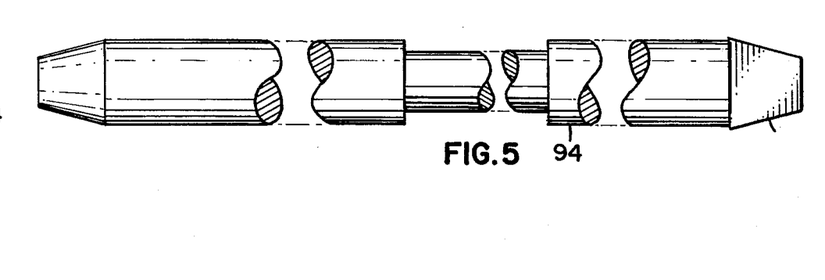
FIG. 5 is an enlarged view of the docking control shaft of the lift and transfer unit of FIGS. 3 and 4.
Figure 6:
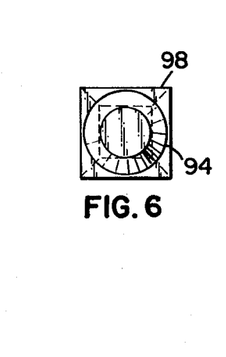
FIG. 6 is an end elevational view of the docking control shaft of FIG. 5.
Figure 7:
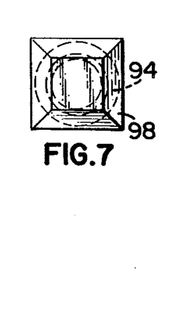
FIG. 7 is an end elevational view of the docking control shaft of FIGS. 5 and 6 illustrating the opposite end than the view shown in FIG. 6.
Figure 8:
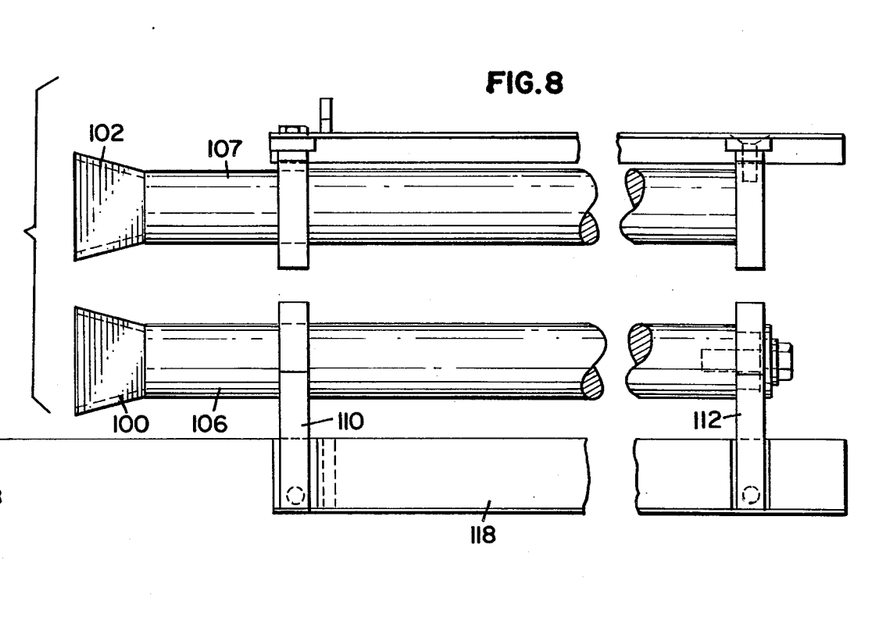
FIG. 8 is a plan view of the shaft and stop on each lane of the storage racks utilized with the present invention.
Figure 9:
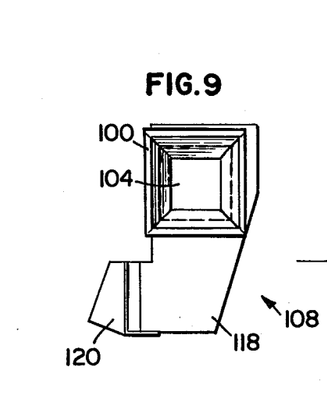
FIG. 9 is a side elevational view of the stop of the present invention.

Another novel feature of the present invention is a mechanical stop 108 which prevents the vehicle 16 from driving off the end of a storage lane 24 when the lift and transfer unit 28 is not in position to receive it. The stop 108 is mounted proximate the end of the lane 24, at the left end of the track 66 as viewed in FIG. 10. The stop 108 is connected to a stop actuation control shaft 106 by means of pivot arms 110 and 112. The stop 108 is moveable between a first, closed or stopped position (which is shown by the solid line in FIG. 10) and a second, open position (shown by the dashed line in FIG. 10). When in the closed position, the extension plate 120 extends into the path of the vehicle framework, thereby blocking movement of the vehicle 16 into the lane 24 when the vehicle 16 is moving from the lift and transfer unit 28 or vice versa. In the preferred embodiment, the stop 108 consists of a stop actuation angle 118 having an extension portion 120 on one end thereof. The stop 108 is interconnected to the receiver housing or aperture 100, so that rotation of the receiver housing 100, which occurs due to the rotation of the control shaft 94, causes movement of the stop 108. Rotation of the docking control shaft 94 is powered by a stop motor 97. The stop motor 97 is operatively connected to a roller chain (not shown), which rotates the shaft 94. The shaft 94 is shown in detail in FIGS. 5, 6, and 7. The end of the shaft 94 includes a docking shaft actuator 98 having a generally square taper in the preferred embodiment. This docking shaft actuator 98 makes contact with the corresponding receiving end 100 in the lane 24 so as to control movement of the stop 108.

Figure 10:
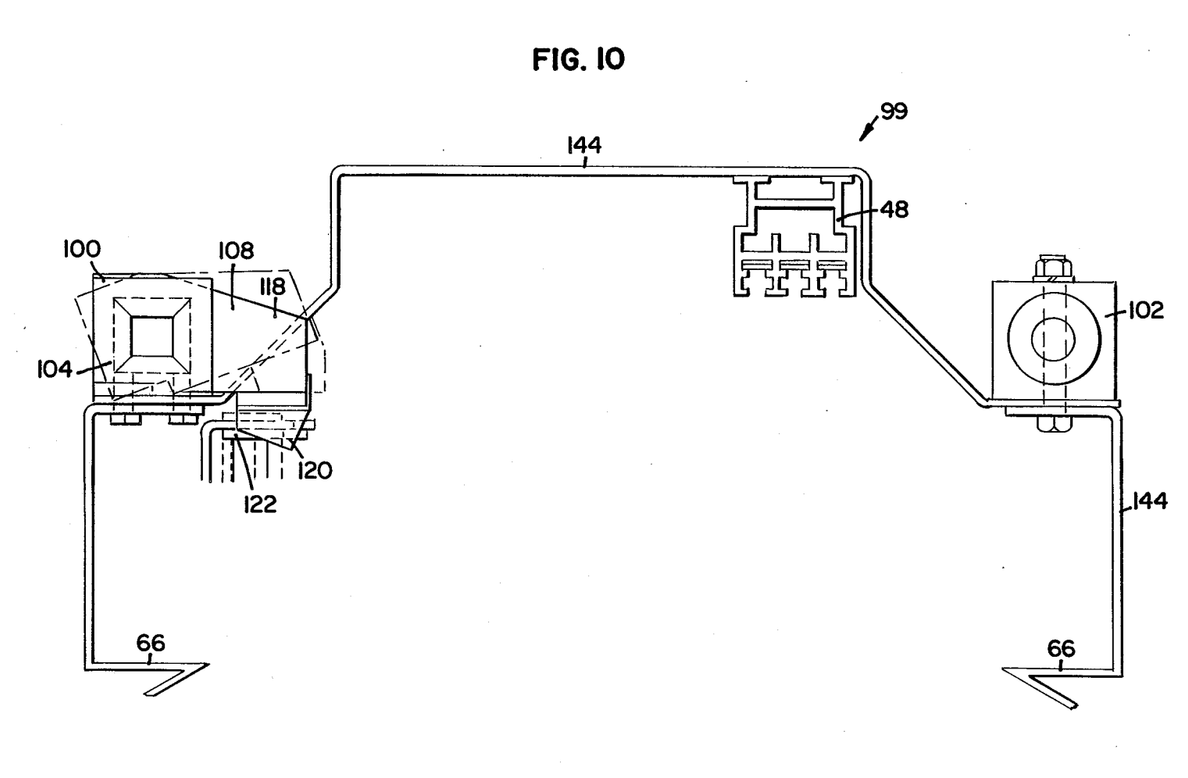
FIG. 10 is an elevational view of a portion of the end of the flow rack assembly utilized with the present invention.

As an additional safety feature, an optional proximity sensor 122 mounted upon the vehicle 16 and shown in FIG. 10, cutaway from vehicle 16, senses the position of the stop actuation angle 118 to determine whether the vehicle 16 may move from the lane 24 to the lift and transfer unit 28. The sensor 122 senses metal in the preferred embodiment and deactivates drive motor 52 so the vehicle 16 will stop.

In the event that the sensor 122 fails to detect the stop activation angle 118, the stop 108 acts as a physical barrier which does not allow the vehicle 16 to move. Docking must be complete enough so that the gap between the lift and transfer unit track 64 and the track 66 of the lane 24 is closed. The wheels 42 of the vehicle 16 may then cross between the lift and transfer unit 28 and the lane 24.

In operation of the docking procedure, the vehicle 16 drives into the lift and transfer unit 28. The carriage assembly 131 supports the vehicle 16 within the lift and transfer unit 28. At this point, the cam followers 86 on the carriage assembly 131 are in the left, wide portion 92 of the cutout 88 on the lift and transfer unit frame 130. After the vehicle 16 drives therein, the carriage assembly 131 moves with respect to the stationary framework 130 so as to move the cam follower 86 into the central portion or the cutout 88 and prevent undesirable shifting of the carriage 131 with respect to the lift and transfer unit frame 130. The lift and transfer unit 28 then moves vertically (if necessary) to the appropriate tier 33, 35 and horizontally to the appropriate lane 24. The lift and transfer unit 28 and vehicle 16 are then positioned proximate the appropriate lane 24.

The docking motor 80 hen activates so as to cause movement of the carriage assembly 131 and vehicle 16 toward the storage lane 24. Activation of the docking motor 80 is in response to suitable sensing means which detects the proper lane 24 and tier 33 or 35. The docking motor shifts the cam follower 86 into the right, wide portion of the cutout 88, as viewed in FIG. 4. The clearance between the cam follower 86 and the cutout 88, as well as the movement of the ball transfers 82, allows the carriage to "float" or shift until the docking shafts 94, 96 become aligned with the respective receivers 100, 102. Engagement of the shafts 94, 96 with the receivers 100, 102 brings the vehicle track 64 on the lift and transfer unit 28 into alignment with the vehicle track 66 on the lane 24. This docking procedure also aligns the bus bars 48 on the lift and transfer unit 28 and the lane 24. Once proper alignment of the shafts 96 and 94 has been achieved and the vehicle 16 is docked to the storage racks 22, activation or the stop motor 97 causes the mechanical stop 108 to move into its open position to allow the vehicle 16 to move into the storage area 22. The vehicle drive motor 52 is then activated and the vehicle 16 drives into the storage lane 24. The stop motor 97 then causes rotation of the mechanical stop 108 into its closed position to prevent a vehicle 16 from inadvertently being driven off the end of the lane 24 without the lift and transfer unit 28 being in position to accept the vehicle 16.

Other modifications of the invention will be apparent to those skilled in the art in light of the foregoing description. This description is intended to provide specific examples of individual embodiments which clearly disclose the present invention. Accordingly, the invention is not limited to these embodiments or the use of elements having specific configurations and shapes as presented herein. All alternative modifications and variations of the present invention which follow in the spirit and broad scope of the appended claims are included.

What is claimed is:

1. A system for storing and retrieving goods within a structure having an entrance area and an exit area, comprising:
    (a) a vehicle for transporting the goods between said areas, said vehicle having a plurality of wheels driven by drive means;
    (b) electrical control means operatively interconnected to said vehicle drive means;
    (c) a track, said track including a track rail configuration upon which said vehicle wheels are supported, said track interconnecting a plurality of areas within said structure;
    (d) storage means for storing the goods, said storage means having a plurality of lanes, each lane including a storage rail configuration corresponding to said track rail configuration; and
    (e) vehicle transfer means positioned proximate said storage means, wherein said vehicle transfer means includes means for moving a stationary vehicle in a lateral direction so as to position said vehicle proximate a particular lane, said vehicle transfer means having a transfer means rail configuration corresponding to said track rail configuration.

2. The system of claim 1, further comprising vehicle turning means positioned between a plurality of said tracks, wherein said turning means includes a rotatable rail configuration corresponding to said track rail configuration.

3. The system of claim 1, wherein said storage means includes a plurality of tiers of lanes, said vehicle transfer means further including means for moving a stationary vehicle in vertical direction so as to position said vehicle proximate a particular tier.

4. The system of claim 1, wherein said storage means comprises a flow rack assembly having a plurality of lanes and tiers, each of said lanes including a retainer rail proximate a bottom end or each lane for supporting stored goods.

5. The system of claim 4, wherein said vehicle includes flanges for supporting the goods, said flanges being movable between a first lower position wherein said flanges are below said retainer rail, and a second upper position wherein said flanges are above said retainer rail.

6. The system of claim 5, wherein said vehicle includes a cam assembly for movement of said flanges between said first and second positions.

7. The system of claim 1, wherein said track is supported above ground level of said structure, said vehicle wheels being positioned upon an upper portion of said vehicle so that said vehicle hangs from said track.

8. The system of claim 1, further comprising transfer means for transferring a vehicle from a first vehicle support structure having a first track member to a second vehicle support structure having a second track member, said apparatus comprising:
(a) alignment means for aligning said first and second track members, said alignment means including a shaft mounted upon said first vehicle support structure and a corresponding aperture positioned upon said second vehicle support structure;
(b) sensing means for sensing the engagement of said shaft and corresponding aperture; and
(c) drive means interconnected to said sensing means for moving said vehicle from said first track member to said second track member.

9. A system for storing and retrieving goods within a structure having an entrance area and an exit area, comprising:
(a) a vehicle for transporting the goods between said areas, said vehicle means having a plurality of wheels driven by drive means;
(b) electrical control means operatively interconnected to said vehicle drive means;
(c) a track, said track including a track rail configuration upon which said vehicle wheels are supported, said track interconnecting a plurality of areas within said structure;
(d) storage means for storing the goods, said storage means having a plurality of lanes, each lane including a storage rail configuration corresponding to said track rail configuration;
(e) vehicle turning means positioned between a plurality of said tracks, wherein said turning means includes a rotatable rail configuration corresponding to said track configuration;
(f) vehicle transfer means positioned proximate said storage means, wherein said vehicle transfer means includes means for moving a stationary vehicle in a lateral direction so as to position said vehicle proximate a particular lane, said vehicle transfer means having a transfer means rail configuration corresponding to said track rail configuration; and
(g) alignment means for aligning said rail configurations before said vehicle passes between separate rail configurations.

10. A vehicle for transporting goods comprising:
(a) a framework having flanges at a bottom end thereof for supporting the goods, said framework forming a holding area sized and configured to accommodate the goods;
(b) a plurality of wheels supporting said framework;
(c) drive means interconnected to said wheels for rotation thereof in forward and reverse directions;
(d) electrical control means operatively interconnected to said drive means; and
(e) lift means for moving said framework in a vertical direction with respect to said wheels wherein said lift means includes a rotatable cam including a cam follower, said lift means having a framework member supported by said cam follower, wherein vertical movement of said cam follower causes vertical movement of said framework, said lift means having a lift motor operatively interconnected to said rotatable cam.

11. An apparatus for transferring a vehicle from a first vehicle support structure to a second vehicle support structure, said apparatus comprising:
(a) a stationary framework;
(b) a vehicle carriage supported by said framework, said vehicle carriage supporting said vehicle, said vehicle carriage having a carriage rail configuration corresponding to a rail configuration on said first and second vehicle support structures;
(c) shaft alignment means for aligning said vehicle carriage rail configuration with respect to said rail configuration of one of said vehicle support structures, said alignment means comprising a shaft mounted upon said vehicle carriage and a corresponding aperture mounted upon said vehicle support structure;
(d) sensing means for sensing the engagement of said shaft and corresponding aperture; and
(e) drive means interconnected to said sensing means for moving said vehicle from said vehicle carriage to one of said vehicle support structures.

12. The transfer apparatus of claim 11, further comprising cam alignment means for aligning said vehicle carriage rail configuration with respect to said rail configuration of one of said vehicle support structures, said cam alignment means including a cutout within said stationary framework, said cutout having a narrow portion between two wide portions, a cam follower attached to said vehicle carriage being slidably engaged within said cutout.

13. The transfer apparatus of claim 11, further comprising a stop mounted upon a vehicle support structure, said stop being movable between a first position outside a vehicle travel path and a second position blocking said vehicle travel path, wherein said stop moves into said first position when said shaft and corresponding aperture are engaged.

14. A method for transporting, storing and retrieving goods within a warehouse having a storage area, comprising the steps of:
(a) loading the goods within a vehicle, said vehicle being supported by a transport track;
(b) moving said vehicle along said transport track;
(c) aligning said transport track with a storage area track;
(d) sensing the alignment of said transport track with said storage area track;
(e) transferring said vehicle from said transport track to said storage area track;
(f) depositing the goods within said storage area; and
(g) moving said vehicle away from said storage area.

* * * * *

UNITED STATES PATENT AND TRADEMARK OFFICE
CERTIFICATE OF CORRECTION

PATENT NO.   :  4,950,119

DATED        :  August 21, 1990

INVENTOR(S)  :  Keith W. Nord and Mark S. Nord

It is certified that error appears in the above-identified patent and that said Letters Patent is hereby corrected as shown below:

In column 3, line 45, please substitute "first in first out" with --first in - first out--.

In column 5, line 42, please substitute "21" with --24--.

In column 9, line 13, please insert --(not shown)-- after the word "followers".

In column 11, line 64, please substitute "or" with --of--.

In column 12, line 3, please substitute "hen" with --then--.

In column 13, line 6, please insert --a-- after the word "in".

In column 13, line 11, please substitute "or" with --of--.

In column 13, line 44, please delete the word "means" after the word "vehicle".

Signed and Sealed this

Eighteenth Day of February, 1992

Attest:

HARRY F. MANBECK, JR.

*Attesting Officer*          *Commissioner of Patents and Trademarks*